UNITED STATES PATENT OFFICE.

WILLIAM FIELDS, OF WILMINGTON, DELAWARE.

IMPROVEMENT IN PROCESSES OF UTILIZING BESSEMER STEEL WASTE.

Specification forming part of Letters Patent No. 176,130, dated April 18, 1876; application filed March 8, 1876.

To all whom it may concern:

Be it known that I, WILLIAM FIELDS, M. D., of Wilmington, in the county of New Castle and State of Delaware, have invented certain new and useful Improvements in Utilizing Waste Bessemer Steel; and I do hereby declare the following to be a full, clear, and exact description of the invention, such as will enable others skilled in the art to which it pertains to make and use it.

My invention relates to a process for utilizing the waste of Bessemer steel; and it consists in smelting the scrap, old rails, and other waste parts with certain ingredients, which will be more fully described hereinafter, whereby the steel is again made as fit for use as in the first instance.

With the first charge of the waste Bessemer steel in a cupola or blast furnace, to each ton I add four pounds of chromate of iron; two pounds of sal-ammoniac; two pounds of saleratus; one pound of sal-soda; one pound of York ore; one pound of litharge; twenty pounds of scale of iron.

In the second charge, after the molten metal has been run into the puddling-furnace, the following chemicals are added and well stirred: Four to six pounds of chromate of iron; two pounds of sal-ammoniac; one to two pounds of black oxide of manganese; one pound of antimony; one pound of wolfram; one half pound of saltpeter; one gallon of fine charcoal.

The metal is then run into molds or balled up, hammered into blooms, and rolled into rails, boiler-plate, or bar steel, as desired. If the steel is cast into ingots, no scale is used in the second heat; but when it is to be balled up and hammered and rolled, twenty pounds of iron scale are used.

Having thus described my invention, I claim—

The process herein described of utilizing Bessemer waste steel, consisting of melting it twice in separate charges in the presence of or mixed with chemicals, substantially as described.

In testimony that I claim the foregoing I have hereunto set my hand this 25th day of February, 1876.

WILLIAM FIELDS.

Witnesses:
JNO. HENRY PUHL,
SAMUEL MARSHALL.